No. 732,351.

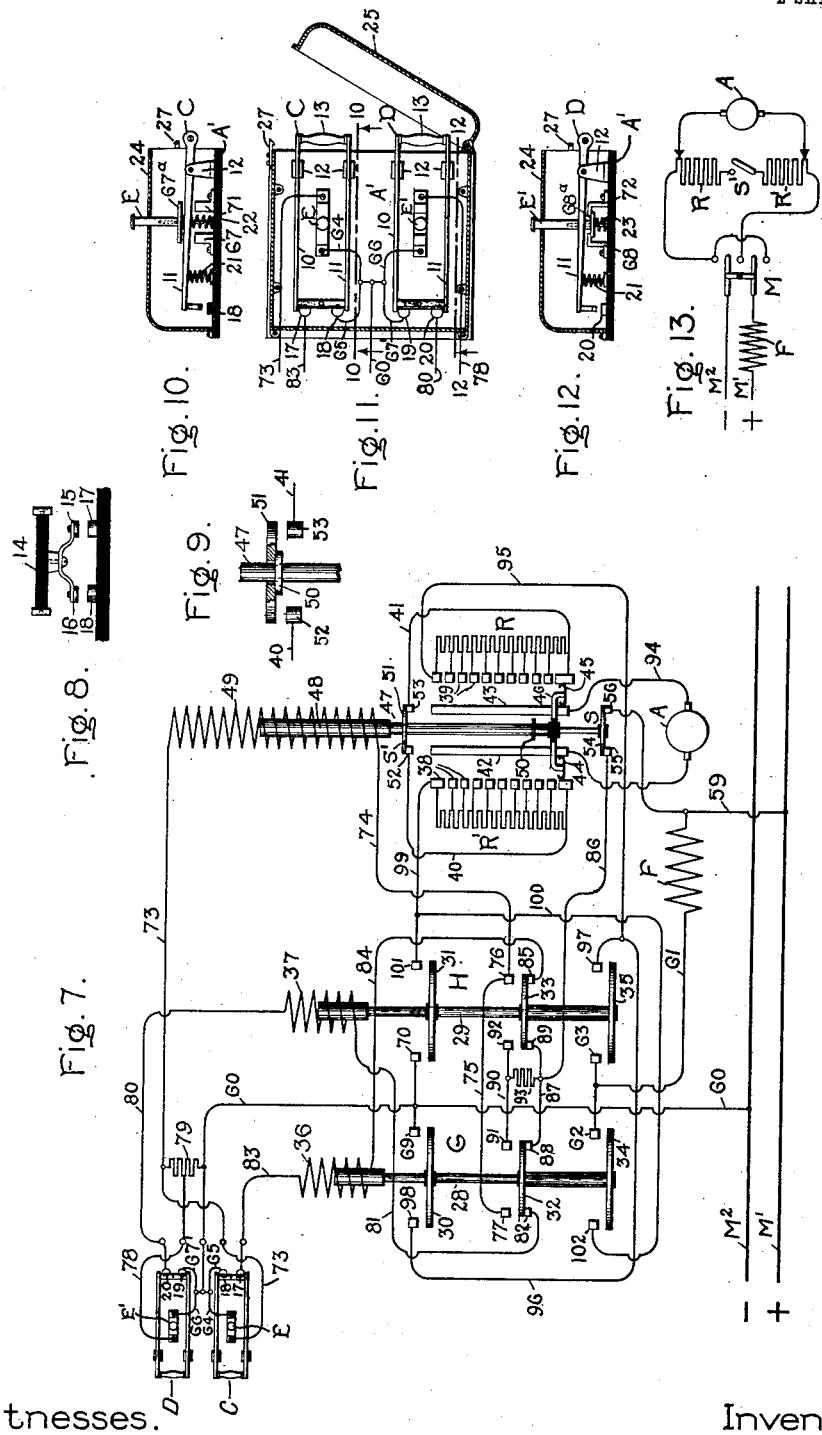

Patented June 30, 1903.

UNITED STATES PATENT OFFICE.

GEORGE H. HILL, OF SCHENECTADY, NEW YORK, ASSIGNOR TO GENERAL ELECTRIC COMPANY, A CORPORATION OF NEW YORK.

SYSTEM OF MOTOR CONTROL.

SPECIFICATION forming part of Letters Patent No. 732,351, dated June 30, 1903.

Application filed April 1, 1903. Serial No. 150,542. (No model.)

*To all whom it may concern:*

Be it known that I, GEORGE H. HILL, a citizen of the United States, residing at Schenectady, in the county of Schenectady and State of New York, have invented certain new and useful Improvements in Systems of Motor Control, of which the following is a specification.

My invention relates to a system of motor control which is capable of general application, but which is particularly applicable to the control of motors of the class used in operations which call for great flexibility and rapidity of action in the handling of heavy loads, such as hoisting, revolving turrets, traversing and elevating ordnance, and the like.

One object of my invention is to devise a system of control which shall embody the starting advantages of a series motor and the stopping or braking advantages of a shunt-motor, and, generally stated, this is accomplished by providing a motor whose field is connected at all times between the supply-mains in series with a resistance, about more or less of which the motor-armature may be shunted. The distinguishing feature of this arrangement over the arrangements in present use is that the motor-field remains connected with the main line at all times, and therefore when the armature acts to produce a braking effect the field receives its supply of current from the line instead of from the armature, as is the usual practice.

My invention also comprises a novel arrangement of controlling-switches in which push-buttons are located in such proximity to manually-operated switches that when either switch is grasped by the hand in the act of operating it the adjacent push-button will be in the right position to be pressed by the thumb.

My invention also comprises other features and details which will be hereinafter described, and particularly pointed out in the appended claims.

Figure 1:
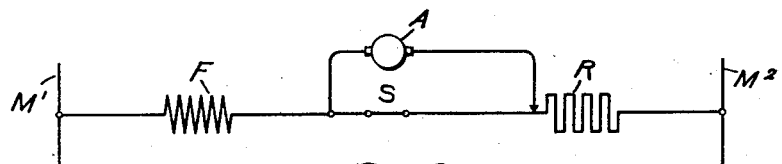
Figure 2:
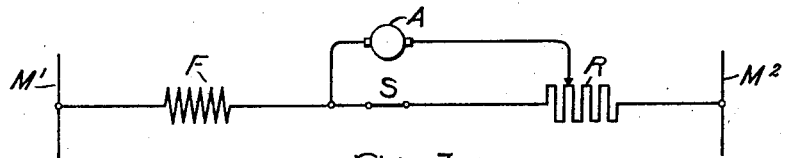
Figure 3:
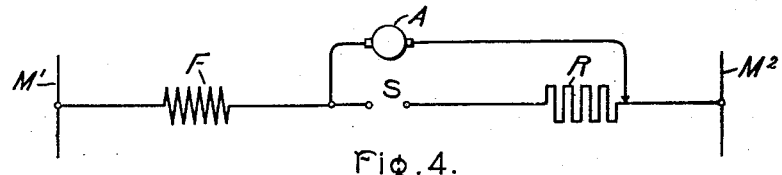
Figure 4:
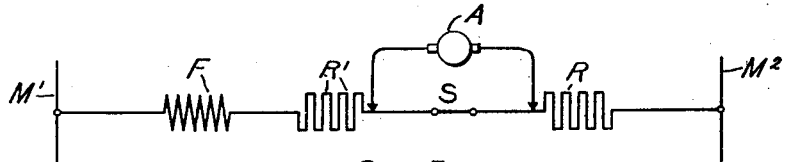
Figure 5:
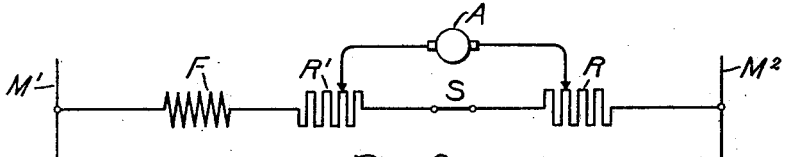
Figure 6:
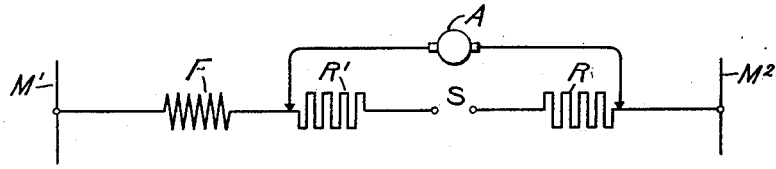

In the accompanying drawings, which are to be considered in connection with this description, Figures 1, 2, and 3 are diagrams of different motor connections, illustrating in a simple form one feature of my invention. Figs. 4, 5, and 6 are similar diagrams illustrating corresponding motor connections where two sets of resistance-coils are used. Figs. 7 to 13, inclusive, illustrate a specific embodiment of my invention embracing the above and other features. Of these Fig. 7 is a diagram illustrating the various parts and their electrical connections. Fig. 8 is an end view of the contacts of one of the controlling-switches. Fig. 9 is a detail of a switch operated in connection with the rheostat. Fig. 10 is a section taken on the line 10 10 of Fig. 11 and illustrates one of the controlling-switches and a normally open push-button to be used in conjunction therewith. Fig. 11 is a plan view of the controlling-switch, showing the surrounding casing and its cover in section. Fig. 12 is a sectional view, taken on the line 12 12 of Fig. 11, similar to Fig. 10, but showing the other controlling-switch and a normally closed push-button to be used in conjunction therewith; and Fig. 13 is a diagram showing the same motor connections as Fig. 6 with the addition of reversing-switch mechanism.

Referring particularly to the motor connections illustrated in Figs. 1 to 6, inclusive, M' M² designate supply-mains, F and A the motor field and armature, respectively, R and R' resistances, and S a switch. The field F and a resistance R or R R' are connected in series between the mains M' M², and the armature A is shunted about a portion of said connection and provided with one or more movable contacts, so that it may be short-circuited upon itself, as illustrated in Figs. 1 and 4, shunted about a portion of the resistance, as illustrated in Figs. 2 and 5, or shunted about all of said resistance, as illustrated in Figs. 3 and 6. At starting the motor connections are those illustrated in Figs. 1 and 4, in which the armature is short-circuited upon itself. Preferably this short circuit is provided with some appreciable resistance, so that only sufficient current passes through the armature to give it a very low speed, which may be increased by changing the connections so as to shunt the armature about a portion of the resistance, as illustrated in Figs. 2 and 5. By gradually increasing the resistance shunted the speed is gradually increased until all the resistance is shunted. At this point the switch S, which has remained closed heretofore, is opened and the motor thereby connected as a normal series motor with no resistance in the field, which is the condition of maximum speed. If now it is desired to reduce the speed the reverse operation takes place, and the amount of resistance shunted is gradually reduced until the short-circuited position of the armature is reached. If at any time during this operation the momentum acquired by the load tends to drive the motor as a generator, the field is not dependent for its current-supply solely upon the armature, but receives current directly from the mains, thereby remaining practically uniform, whereby a maximum braking effect is produced.

Referring now to Figs. 7 to 13, inclusive, A' designates an insulating-base, upon which is mounted a pair of controlling hand-operated switches C D, each of which is provided with parallel members 10 11, pivoted to suitable supports 12 and connected at one end by handles 13 and at the other by an insulating-bar 14, which carries yielding contacts. The yielding contacts 15 16 of the switch C are adapted to electrically connect the fixed contacts 17 18, and the similar yielding contacts of the switch D are adapted to connect the fixed contacts 19 20. The switches C and D are held normally in open position by suitable springs 21. Upon the base A' are also mounted two push-buttons E E'. The push-button E is provided with fixed contacts 67 71 and a movable contact 67$^a$, which is retained normally out of contact with said fixed contacts 67 and 71 by a spring 22, and a push-button E' is provided with fixed contacts 68 72, which overhang a movable contact 68$^a$, which is normally held in contact with said fixed contacts 68 and 72 by a spring 23. The upper end of each of these buttons extends through a protective casing 24, which suitably incloses all of the switches and which is provided with a suitably-hinged cover 25, having a latch 27.

In Fig. 7 I have illustrated two circuit-closers G and H, which are provided with stems or plungers 28 29, upon which are mounted the contact-disks 30, 31, 32, 33, 34, and 35, suitably insulated therefrom. The disks 32 34 of the circuit-closer G and disks 33 35 of the circuit-closer H are electrically connected, respectively. Each of these disks is adapted to connect electrically a number of pairs of contacts, hereinafter referred to. Each of the stems of the circuit-closers G and H terminates in cores, which pass into the coils 36 and 37, respectively. Coöperating with these circuit-closers is a rheostat comprising two rows of contacts 38 39, suitably connected to interposed resistances R' and R, respectively. Adjacent to these contacts 38 39 are two contact-strips 42 43, with which they are adapted to be connected electrically by the movable contacts 44 45, attached to the arm 46, suitably supported upon and insulated from the stem 47. The stem 47 terminates at its upper end in a core 48, which enters the coil 49, which when energized moves the core and stem in a vertical direction, thus operating the rheostat to vary the amount of resistance in circuit. The stem 47 is also provided with a collar 50, located upon it at such a point that when the contacts 44 and 45 reach their uppermost position the collar 50 will have pressed against and raised the contact-disk 51 to disengage it from the contacts 52 and 53, which are connected by the wires 40 41 with the lowermost coils of the resistances R' and R, respectively. At the lower end of the stem 47 is a suitable switch S, comprising a contact-disk 54, mounted upon the stem 45 and suitably insulated therefrom, which normally engages and electrically connects the contacts 55 and 56, but which disconnects said contacts when the stem 47 is drawn up. Referring to the electrical connections of these parts, M' and M$^2$ designate supply-wires connected with some suitable source of current and 59 and 60 leads connected therewith. The lead 59 terminates in a contact 56 and is provided with a branch 61, which includes the armature-field F and terminates in the contacts 62 and 63 adjacent to the disks 34 and 35 of the circuit-closers G and H. The lead 60 extends to and is electrically connected with the push-buttons E E' and hand-operated switches C D, comprising the controller-set, previously described. The wires 65 and 67' connect this lead with the contacts 18 and 19 of the switches C and D, respectively, and the wires 64 and 66 connect it with the fixed contacts 67 and 68 of the push-buttons E and E', respectively. The lead 60 is also electrically connected with the contacts 69 and 70 of the circuit-closers. One terminal of the solenoid 49 is connected by the wire 73 with the contact 71 of the push-button E, while the other terminal connects through the wires 74 and 75 with the contacts 76 and 77 of the circuit-closers. The contact 72 of the push-button E' is connected by the wire 78 to the middle point of a resistance 79, bridged between the lines 73 and 60 for a purpose hereinafter stated. The terminal 17 of the switch C is connected by the wire 83 with the solenoid 36, which has its opposite terminal connected through the wire 84 with the contact 85 of the circuit-closer H. Similarly the contact 20 of the switch D is connected by the wire 80 with the solenoid 37, which has its opposite terminal connected by the wire 81 with the contact 82 of the circuit-closer G. The contact 55 is connected by the wire 86 with the wire 87, which has its opposite ends connected to the contacts 88 and 89. A wire 90 connects the contacts 91 92, and a resistance 93 is bridged between the wires 87 and 90. Bridged between the strips 42 and 43 of the rheostat in the line 94 is the motor-armature A. Wires 95 and 96 connect the upper terminal 39 of the rheostat to the contacts 97 and 98, respectively, of the circuit-closers. Similarly the wires 99 and 100 connect the upper terminal 38 of the rheostat with the contacts 101 and 102 of said circuit-closers.

In Fig. 13, which shows the same motor connections as Fig. 6, I have represented the reversing-switch mechanism by the switch M.

Through the agency of the above connections the circuit-closers G and H may be actuated to close the armature-circuit, so as to drive the armature in either direction by closing the appropriate controlling-switches C or D. When either circuit-closer is in closed position, the push-buttons E and E' may be operated to actuate the rheostat to vary the amount of resistance about which the motor-armature is shunted. While the circuit-closers are in open position, a circuit extends from the supply-wire M' through the lead 59, contacts 56 55, and wire 86 to the wire 87, where it divides, part passing through the contacts 89 85 of the circuit-closer H, wire 84, solenoid 36 of the circuit-closer G, and wire 83 to contact 17 of the switch C and part passing through contacts 88 82 of circuit-closer G, wire 81, solenoid 37 of circuit-closer H, and wire 80 to contact 20 of switch D. The contacts 18 and 19 of the switches C and D are suitably connected to the return-lead 60. From the above it will be seen that when the switch D is closed the solenoid 37 is energized, the circuit-closer H is closed, and thereby the branch extending through the solenoid 36 of the circuit-closer G is broken at the contacts 89 and 85, so that if the switch C is then closed it will have no effect on said circuit-closer G. Similarly when the circuit-closer G is in closed position the closing of the circuit by the switch D is ineffective to operate the circuit-closer H. Thus neither circuit-closer can be closed unless the other is in open or normal position. Similarly neither circuit-closer can be closed unless the rheostat is in normal position. This is because the only path for the current through the solenoids 36 and 37 when the circuit-closers are in open position is through the rheostat-switch S, embracing the contacts 54, 55, and 56, and as soon as the rheostat is moved from normal position this path is broken. However, since it is necessary to constantly energize the solenoids of the circuit-closers in order to keep them in closed position an additional path through these solenoids must be provided which will be complete or closed for the solenoid of either circuit-closer when said circuit-closer has been moved to closed position and when the path through the rheostat-switch S is open, but which shall be incomplete or open when the rheostat-switch is closed and the circuit-closers are in normal or open position. Such a path includes the lead 59, field F, wire 61, and, considering the circuit-closer H closed and the circuit-closer G open, contact 63, disks 35 and 33, which are electrically connected, contact 92, wire 90, resistance 93, wire 87, contacts 88, 82, wire 81, solenoid 37, wire 80 through the switch D to the return-lead 60 or, considering circuit-closers H open and G closed, from wire 61 through contact 62, disks 34 and 32 of the circuit-closer G, contact 91, wire 90, resistance 93, wire 87, contacts 89, 85, wire 84, solenoid 36, wire 83, and switch C to the return-lead 60, thus keeping the solenoid of the circuit-closer G energized and holding it closed. These paths, as indicated, include a resistance 93, inserted for the purpose of cutting down the current-flow through the solenoids. Thus current through the path including the rheostat-switch S is used to energize initially either circuit-closer solenoid, depending upon the controlling-switch that is closed. Current through this path and the path embracing the electrically-connected disks of the operated circuit-closer continue to energize the solenoid of the operated circuit-closer while the rheostat remains in normal position, and current through the latter path alone energizes said solenoid when the rheostat is moved from normal position. All these paths lead through either the controlling-switch C or D, and therefore if at any time during the operation the controlling-switch be opened the active solenoid will be de-energized and its circuit-closer will be opened. Just as neither circuit-closer can operate unless the rheostat is in normal position, so the rheostat cannot be operated unless one of the circuit-closers has been closed. This is because the only path through which current is supplied to the rheostat solenoid 49 is broken at disks 32 and 33 when the circuit-closers are in open position. When, however, either circuit-closer is closed while the rheostat remains in normal position, current flows through both the path including the rheostat-switch S and the path including the electrically-connected disks of the actuated circuit-closer as previously traced, and when the rheostat is moved to other than normal position through the latter path only to either the disk 32 or disk 33, depending on which circuit-closer has been closed, and from this point, in case circuit-closer G is closed, through contact 77, wire 75, contact 76, or, in case circuit-closer H is closed, contact 76, then in both cases through wire 74, solenoid 49, wire 73, one-half of resistance 79, wire 78, push-button E', which is normally closed, wire 66, and return-lead 60. Therefore as soon as a circuit-closer has been closed current flows through the solenoid 49; but by reason of the resistance 79, one-half of which is in circuit, the solenoid is unable to draw up its core 48. However, by means of the push-button E, located adjacent to the switch C, so that it may be pressed by the thumb of the hand which grasps the handle of the switch C, said resistance 79 may be short-circuited through the wire 73, push-button E, wire 64, and lead 60. With the resistance 79 removed from the circuit the solenoid is able to draw up its core 48, and thereby operate the rheostat. If the solenoid-core 48 has been raised some distance, it may be held in that position by simply releasing the pressure on the button E, thereby opening the short circuit and restoring the circuit through one-half of the resistance 79, above traced. Including this portion of the resistance 79 in circuit allows just enough current to pass through the solenoid 49 to hold its core, and hence the rheostat, at the position it had reached when the push-button E was released. If it is desired to return the rheostat-contacts to normal position without opening the motor-circuit, the push-button E', which is normally closed, may be opened, thereby throwing all the resistance 79 in circuit with the solenoid. This increased resistance will cut down the current, so that the solenoid can no longer hold its core, which will then return to normal position under the action of gravity. When the circuit-closer G is closed, the resulting motor-circuits are as follows: supply-main M', lead 59, field F, wire 61, contact 62, disk 34, contact 102, wires 100 99, resistance R', there branching, one branch including movable contact 44, contact-strip 42, wire 94 including the armature A, contact-strip 43, movable contact 45, and another branch including wire 40, switch S', wire 41, there both branches uniting and the circuit continuing, including resistance R, wires 95 96, contacts 98 and 69, joined by disk 30, return-lead 60, and supply-main M². When the circuit-closer H is closed, similar resulting circuits are completed as follows: supply-main M', lead 59, field F, wire 61, contacts 63 and 97, joined by the disk 35, wire 95, through the resistance R R' and the armature A, as before, but in the opposite direction, and thence from resistance R' through wire 99, contacts 101 and 70, joined by disk 31, return-lead 60, to supply-main M². Thus the motor may be driven in either direction by closing the appropriate circuit-closer.

Briefly stated, then, the operation is as follows: If it is desired to drive the motor in one direction, the switch C is closed to actuate the circuit-closer G, which will result in sending current through the motor, as above indicated. If it is desired to operate the motor in the opposite direction, the switch D is closed, thereby closing the circuit-closer H to send current through the armature in the opposite direction. The closing of either of the switches C or D results in making the connections illustrated in Fig. 4, which give a very low armature speed. If it is desired to increase the speed, the push-button E is closed to short-circuit the resistance 79, thereby energizing the solenoid 49 to operate the rheostat and cause the motor-armature to be shunted about a portion of the resistance, as indicated in Fig. 5. When the desired speed has been attained, the push-button may be released, and the rheostat will be held in the position which it has reached. Thus the speed may be maintained at any desired point. If it is desired to decrease the speed, the push-button E' may be operated to throw all the resistance 79 in circuit with the solenoid 49, thereby allowing the rheostat to return to normal under the action of gravity. This movement of the rheostat may be stopped at any time by releasing the push-button E', thereby restoring one-half the resistance 79 to the solenoid-circuit. Thus it is seen that the armature speed may be varied from a very low speed, corresponding to the connections illustrated in Fig. 4, to the maximum speed corresponding to the connections illustrated in Figs. 6 and 13. The connections illustrated in these Figs. 6 and 13 are attained when the core 48 of the solenoid 49 is in its uppermost position. In this position the collar 50 of the stem 47 engages the disk 51 of the switch S' to open the branch including the resistances R and R', thereby connecting the motor as a "straight" series motor, as indicated.

What I claim as new, and desire to secure by Letters Patent of the United States, is—

1. The combination of supply-mains, a series motor connected therewith, a resistance, the motor-field and the resistance being connected in series between said mains, and means for shunting the motor-armature about more or less of said resistance.

2. The combination of supply-mains, a series motor connected therewith, a resistance, the motor-field and the resistance being connected in series between said mains, and means for shunting the armature about more or less of said resistance and short-circuiting the armature upon itself.

3. The combination of supply-mains, a motor connected therewith, a resistance, the motor-field and said resistance being connected in series between said mains, and means for shunting the motor-armature about more or less of said resistance and opening the circuit including said resistance when the amount shunted is a maximum.

4. The combination of supply-mains, a motor connected therewith, a resistance, means for shunting the motor-armature about more or less of said resistance, means for breaking the circuit including said resistance operable only when the maximum amount of said resistance is shunted, and means for closing the circuit through said armature operable only when a minimum of said resistance is shunted.

5. The combination of supply-mains, a motor connected therewith, a resistance, the motor-field and said resistance being connected in series between said mains, means for shunting the motor-armature about more or less of said resistance, and means for breaking the circuit including said resistance operable only when the maximum amount of said resistance is shunted, and means for reversing the direction of current-flow in said armature operable only when a minimum of said resistance is shunted.

6. The combination of supply-mains, a motor connected therewith, a resistance, means for shunting the motor-armature about more or less of said resistance, switching mechanism for opening and closing the circuit through said armature, and means for preventing the closing of said switching mechanism except when a minimum of said resistance is shunted.

7. The combination of supply-mains, a motor connected therewith, a resistance, the motor-field and said resistance being connected in series between said mains, means for shunting the motor-armature about more or less of said resistance, switching mechanism for opening and closing the circuit through said armature, and means for preventing the closing of said switching mechanism except when a minimum of said resistance is shunted.

8. The combination of supply-mains, a motor connected therewith, a resistance, means for shunting the motor-armature about more or less of said resistance, electrically-actuated switching mechanism for opening and closing the circuit through said armature, and means for controlling the action of said electrically-actuated means.

9. The combination of supply-mains, a series motor connected therewith, a resistance, the motor-field and said resistance being connected in series between said mains, means for shunting the motor-armature about more or less of said resistance, and switching mechanism for opening and closing the circuit through said armature.

10. The combination of supply-mains, a series motor connected therewith, a resistance, the motor-field and said resistance being connected in series between said mains, means for shunting the motor-armature about more or less of said resistance, electrically-actuated switching mechanism for opening and closing the circuit through said armature, and means for controlling the action of said electrically-actuated means.

11. The combination of supply-mains, a motor connected therewith, a resistance, electrically-actuated means for shunting the motor-armature about more or less of said resistance, and means for controlling the action of said electrically-actuated means.

12. The combination of supply-mains, a series motor connected therewith, a resistance, the motor-field and said resistance being connected in series between said mains, electrically-actuated means for shunting the motor-armature about more or less of said resistance, and means for controlling the action of said electrically-actuated means.

13. The combination of a plurality of circuit-closers, a controlling-solenoid for each, a rheostat, a controlling-solenoid therefor, a circuit for each of the solenoids, a resistance in circuit with the rheostat-solenoid, and a controlling-switch set comprising a switch for each circuit-closer-solenoid circuit, a switch for short-circuiting said resistance whereby the rheostat is operated and a switch for shunting a portion of said resistance whereby the rheostat may be held in any position to which it has been moved.

14. The combination of a plurality of electrically-actuated circuit-closers, each comprising a solenoid, an electrically-actuated rheostat comprising a solenoid, a circuit for the rheostat-solenoid, means under the control of either circuit-closer for closing said circuit, circuits for the circuit-closer solenoids, means under the control of each circuit-closer for closing the solenoid-circuit of the other circuit-closer, a controlling-switch in each circuit-closer-solenoid circuit, a resistance in the rheostat-solenoid circuit, a switch for shunting a portion of said resistance, and a switch for shunting all of said resistance.

15. The combination of a switch comprising two parallel members suitably pivoted and connected, a handle at one end, a contact at the other and suitable fixed contacts for engagement therewith, and a push-button comprising fixed and movable contacts, said push-button being located between the parallel members of the switch at such a distance from its handle that when said handle is grasped by the hand said button will be in position to be pressed by the thumb.

16. The combination of a switch comprising two parallel members suitably pivoted and connected, a handle at one end, a contact at the other and suitable fixed contacts for engagement therewith, and a push-button comprising fixed and movable contacts, said push-button being located in proximity to the handle and at such a distance therefrom that when said handle is grasped by the hand said button will be in position to be pressed by the thumb.

17. The combination of a pair of switches, each comprising suitably pivoted and connected parallel members, a handle at one end, a contact at the other and suitable fixed contacts for engagement with said contact, and a pair of push-buttons, one normally closed and the other normally open, each button being located between the parallel members of one of said switches at such a distance from its handle that when the handle is grasped by the hand the button will be in the right position to be pressed by the thumb.

18. In a switch mechanism, a plurality of fixed contacts, a movable contact adapted to engage the fixed contacts, said movable contact being provided with an aperture, a longitudinally-movable stem passing freely through said aperture, and a projection on said stem adapted to engage said movable contact in the movement of said stem and thereby separate said movable contact from the fixed contacts.

In witness whereof I have hereunto set my hand this 30th day of March, 1903.

GEORGE H. HILL.

Witnesses:
BENJAMIN B. HULL,
HELEN ORFORD.